Patented Feb. 6, 1934

1,946,108

UNITED STATES PATENT OFFICE 1,946,108

PRODUCTION OF CATALYSTS

Mathias Pier, Heidelberg, and Karl Winkler, Ludwigshafen-on-the-Rhine, Germany, assignors, by mesne assignments, to Standard-I. G. Company, Linden, N. J., a corporation of Delaware No Drawing. Application January 3, 1929, Serial No. 330,135, and in Germany January 6, 1928

11 Claims. (Cl. 23—236)

This invention relates to improvements in the manufacture and production of solid catalysts, and in particular of such as may be employed in the destructive hydrogenation of carbonaceous materials, such as varieties of coal, tars, mineral oils, the extraction, conversion and distillation products thereof and the like, and which are known in the art as "sulfur immune catalysts". See Australian Patent No. 1,217 of 1926.

It is known that catalysts have frequently been obtained according to the methods hitherto employed, which were very active but showed little or no mechanical stability, and which were decomposed into such of pulverulent or mealy nature.

We have now found that any catalysts which by themselves have little or no mechanical stability, for example those of a pulverulent or mealy nature, can likewise be converted into an extremely stable and resistant, lump-like, coherent form by incorporating finely divided zinc or aluminium, or alloys of the same either alone or in admixture with one another or with other substances with the constituents usually employed in the manufacture of catalysts, for example with the oxides and hydroxides of heavy metals or earth metals, and in particular oxides of metals of the 6th group of the periodic system, such as chromium oxide, molybdic acid, or tungstic acid, and usually with the said constituents in the form of aqueous pastes. As examples of the aforesaid other substances suitable for addition may be mentioned activators, such for example as metal salts, alkali metal salts or hydroxides and the like, or substances having an acid action when dissolved in water. An admixture of soluble magnesium compounds, for example of magnesium chloride, in addition to the materials above mentioned has been found to be of particular advantage.

The process is usually carried out by incorporating one or more of the said metals or alloys thereof in a finely divided state with an aqueous paste of the constituents of the catalyst and subjecting the said mixture to a mechanical treatment, during which treatment the temperature is preferably not allowed to rise above about 50° C. A kneading treatment is, for example, a very advantageous form of such mechanical treatment. If the temperature rises higher, the products obtained are usually too porous. The catalysts are thereupon gradually dried. In this manner very stable masses are obtained, usually with the evolution of gases.

The quantity of metal powder and the like necessary for the hardening may be very small. When the substances employed for the hardening are also capable of simultaneously exerting a catalytic action in the process for which the hardened catalysts are to be employed, it is frequently advantageous to add more than the quantity necessary for the hardening. The addition of small quantities of other substances, as for example substances having an acid or an alkaline reaction when dissolved in water, frequently accelerates the hardening process and the evolution of gases. In cases where these additions would be injurious to the catalytic action, they can be removed after the stabilization has occurred, for example by washing out or by heating to a high temperature or the like. It is frequently advantageous to employ mixtures of several of the said finely divided metals, or with finely divided alloys of the said metals, and in this case part of these can have special catalytic activity whilst the others serve more for the mechanical stabilization.

The following example will further illustrate the nature of this invention, but the invention is not restricted thereto.

Example

A catalyst prepared from about 65 per cent of molybdic acid and 35 per cent of zinc oxide is very active for the splitting and destructive hydrogenation of hydrocarbons. It is, however, very friable and therefore causes trouble in operation by giving off dust. By adding to an aqueous paste of the said constituents from 1 to 3 per cent of aluminium powder or powdered aluminium bronze, and kneading the mixture, whereby the temperature must not rise above about 50° C. and, after all or the greater part of the metal has disappeared, gradually drying the mixture at higher temperatures, a very stable and hard catalyst is obtained which no longer shows any tendency to give off dust.

Moreover, if by the addition of magnesium compounds or other substances a comparatively good stability of the catalyst has been produced, a still higher stability can be obtained by adding thereto from 1 to 3 per cent of aluminium powder or of aluminium bronze. The addition of the aluminium powder or aluminium bronze causes in all cases an increase in the activity of the catalyst for splitting oils and the like. Thus, for example, the yield of benzine by splitting middle oils, such as are obtained by the destructive hydrogenation of brown coal, is increased by about from 10 to 15 per cent.

What we claim is:

1. A process for the production of a catalyst of high mechanical stability, which comprises incorporating a small amount of aluminium powder with an aqueous paste of molybdic acid and zinc oxide and kneading the mixture, care being taken that during this treatment the temperature does not rise above about 50° C., and after the metal has been fully incorporated in the mixture, gradually drying the mixture.

2. In the production of a solid sulphur immune catalytic mass, the step of incorporating with an aqueous paste of the constituents of said mass a finely divided metal selected from the class consisting of zinc, aluminium and the alloys containing at least one of these metals.

3. In the production of a solid sulphur immune catalytic mass, the step of incorporating with an aqueous paste of the constituents of said mass a finely divided metal selected from the class consisting of zinc, aluminium and the alloys containing at least one of these metals and subjecting the mixture thus obtained to a kneading treatment.

4. In the production of a solid sulphur immune catalytic mass, the step of incorporating with an aqueous paste of the constituents of said mass a finely divided metal selected from the class consisting of zinc, aluminium and the alloys containing at least one of these metals and subjecting the mixture thus obtained to a kneading treatment while not allowing the temperature during said treatment to rise above 50° C.

5. The process of increasing the mechanical stability of a catalyst comprising a heavy metal oxide which comprises incorporating with an aqueous paste comprising such an oxide a finely divided metal selected from the class consisting of zinc, aluminium and the alloys containing at least one of these metals and subjecting the mixture thus obtained to a kneading treatment while not allowing the temperature during said treatment to rise above 50° C.

6. The process of increasing the mechanical stability of a catalyst comprising an oxide of a metal from group six of the periodic system which comprises incorporating with an aqueous paste comprising such an oxide, a finely divided metal selected from the class consisting of zinc, aluminium and the alloys containing at least one of these metals and subjecting the mixture thus obtained to a kneading treatment while not allowing the temperature during the said treatment to rise above 50° C.

7. The process of increasing the mechanical stability of solid sulphur immune catalysts which comprises forming an aqueous paste of the constituents of such a catalyst, incorporating in said paste a finely divided metal selected from the class consisting of aluminium, zinc and the alloys containing at least one of these metals and gradually drying the resulting mixture.

8. The process of increasing the mechanical stability of solid sulphur immune catalysts which comprises forming an aqueous paste of the constituents of such a catalyst, incorporating in said paste a finely divided metal selected from the class consisting of zinc, aluminium and the alloys containing at least one of these metals, kneading the resulting mixture at a temperature not exceeding 50° C. and gradually drying said mixture.

9. The process of increasing the mechanical stability of a catalyst comprising a heavy metal oxide which comprises forming an aqueous paste containing such an oxide, incorporating in said paste a finely divided metal selected from the class consisting of zinc, aluminium and the alloys containing at least one of these metals and gradually drying the resulting mixture.

10. The process, as defined in claim 9, wherein said mixture prior to the drying step is subjected to a kneading treatment at a temperature not exceeding 50° C.

11. The process, as defined in claim 9, wherein the heavy metal oxide comprises an oxide of a metal of group 6 of the periodic system.

MATHIAS PIER.
KARL WINKLER.